US008282105B2

(12) United States Patent
Robertson

(10) Patent No.: US 8,282,105 B2
(45) Date of Patent: Oct. 9, 2012

(54) MECHANICAL PACKING SYSTEM

(76) Inventor: Gary D. Robertson, Jonesborough, TN (US)

( * ) Notice: Subject to any disclaimer, the term of this patent is extended or adjusted under 35 U.S.C. 154(b) by 234 days.

(21) Appl. No.: 12/588,789

(22) Filed: Oct. 28, 2009

(65) Prior Publication Data
US 2010/0102516 A1 Apr. 29, 2010

Related U.S. Application Data

(60) Provisional application No. 61/193,106, filed on Oct. 29, 2008.

(51) Int. Cl.
F16J 15/18 (2006.01)
F16J 15/26 (2006.01)
B21D 53/84 (2006.01)
(52) U.S. Cl. ...................... 277/511; 29/888.3
(58) Field of Classification Search .................. 277/504, 277/510–511, 516, 519–520, 514, 542, 524, 277/924; 29/888.3
See application file for complete search history.

(56) References Cited

U.S. PATENT DOCUMENTS

| | | | | |
|---|---|---|---|---|
| 1,175,056 A * | 3/1916 | Fowler | ........................... | 277/520 |
| 1,336,308 A * | 4/1920 | Lumley | ........................... | 277/350 |
| 2,448,147 A * | 8/1948 | Jacobsen | ........................... | 29/413 |
| 3,313,550 A * | 4/1967 | Culman | ........................... | 277/511 |
| 4,394,872 A * | 7/1983 | Schobl | ........................... | 137/315.28 |
| 4,411,438 A * | 10/1983 | Scobie | ........................... | 277/520 |
| 5,209,496 A * | 5/1993 | Azibert et al. | ................ | 277/520 |
| 5,476,271 A * | 12/1995 | Hatting et al. | ................ | 277/511 |
| 5,749,560 A | 5/1998 | Wolford et al. | | |
| 6,003,875 A * | 12/1999 | Ellis et al. | ...................... | 277/370 |
| 6,834,862 B2 | 12/2004 | Wilkinson | | |
| 6,869,079 B2 * | 3/2005 | Zheng | ........................... | 277/511 |
| 7,044,217 B2 | 5/2006 | Hult | | |
| 7,275,559 B2 | 10/2007 | Morrison et al. | | |
| 2005/0200081 A1 * | 9/2005 | Stanton et al. | ................ | 277/510 |

* cited by examiner

Primary Examiner — Vishal Patel
(74) Attorney, Agent, or Firm — Welsh Flaxman & Gitler LLC

(57) ABSTRACT

A mechanical packing system for use for a device allows one or more packing rings to be installed one at a time and die formed in place. A reversible, detachable flange having a key offset from the center is inserted into a key slot of the hub of the mechanical packing system which is also offset during this installation process. When the device is operated, the flange is detached from the hub rotated 180° and the key of the flange is then inserted into the key slot of the hub. A spacer with integral lantern ring and internal bore surface which reduces or prevents marring or galling. A stuffing box of sufficient length to eliminate the need for a spacer or unneeded packing rings.

8 Claims, 9 Drawing Sheets

Flange In Running Position

Flange In Die Forming Position

Face Profiles for Packing
Gland, Hub and Spacer

Stuffing Box With Profiled Throat Bushing
Length To Accept Reduced Number Of Packing Rings

MECHANICAL PACKING SYSTEM

CROSS-REFERENCE TO RELATED APPLICATION(S)

The present application claims the priority of U.S. provisional patent application Ser. No. 61/193,106, filed on Oct. 29, 2008, and is incorporated herein by reference.

FIELD OF THE INVENTION

The present invention is directed to a mechanical packing system used to seal moving parts of devices such as pumps and valves.

SUMMARY OF THE INVENTION

The present invention is directed to a mechanical packing system utilizing a reversible, detachable flange, a hub and a spacer in conjunction with a device for sealing the moving parts of various devices, such as pumps and valves in order to allow linear, axial or a combination of both motions while retaining fluids within an enclosure.

The system includes a method and system of packing which specifies that one or more packing rings be installed one at a time and die formed in place, under pressure, from an installation device, until a stuffing box is filled. This would allow for each packing ring to be formed in the installed position allowing for the removal of any void or leak path that might be present. Die forming each packing ring one at a time, while loading, results in a far more reliable method of packing than if all the rings were installed at one time when a packing gland is put into place. The reversible flange of the packing gland will allow for its use as an installation tool for the one at a time installation method as well as conventional operation in service.

The packing gland assembly is provided with a hub onto which the reversible flange would be reversibly attached. A key slot extends around the external surface of the hub and is offset from the center of the hub. The reversible flange is provided with a key extending outwardly from the bottom surface of an inner horseshoe shaped surface and is also offset from the center of that horseshoe shaped surface. Therefore, when one of the packing rings is being installed into the mechanical packing system, the key of the flange would be inserted into the key slot of the hub in one position. During the running or operating position, the flange would be rotated 180° and then the key of the flange would again be inserted into the key slot of the hub. When the flange is attached to the hub and while the packing rings are installed, the flange would be affixed to the hub and would be offset from the hub on one side thereof. When the flange is reversed during the operation of the device, the flange would be affixed to the hub and offset therefrom on the second side of the hub.

This forming of the packing material in a closed cavity under pressure is commonly referred to as die forming. Die formed packing rings are produced outside of the device they are to be used in and therefore have dimensions that are smaller than the stuffing box they will be installed in to aid in installation. Die forms, thus made, inherently have voids at the major and minor diameter in the amount of the needed clearance required for installation as well as joints where the packing rings join to complete a closed loop. The proposed method of die forming in place eliminates all voids by completely filling the installation space without the clearance voids inherent in preformed rings or rings cut from long stock. The proposed packing gland is made of sufficient strength to die form the packing in place using available stuffing box, shaft, studs and nuts. This method is particularly desirable for shafts exhibiting reciprocating motion such as valves and cylinders.

DETAILED DESCRIPTION OF THE PREFERRED EMBODIMENTS

Figure 1:
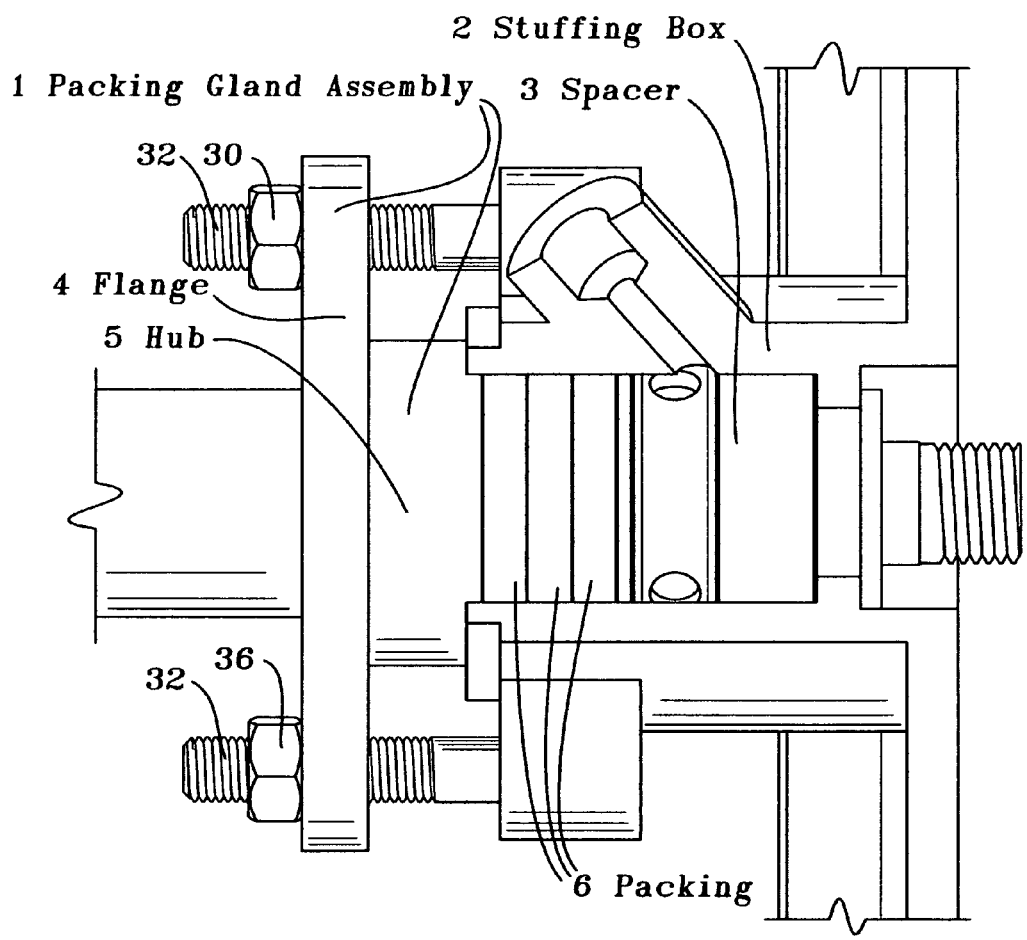
FIG. 1 is a side view of the mechanical packing system utilizing a plurality of packing rings with the reversible flange in the running or operating position.
Figure 2:
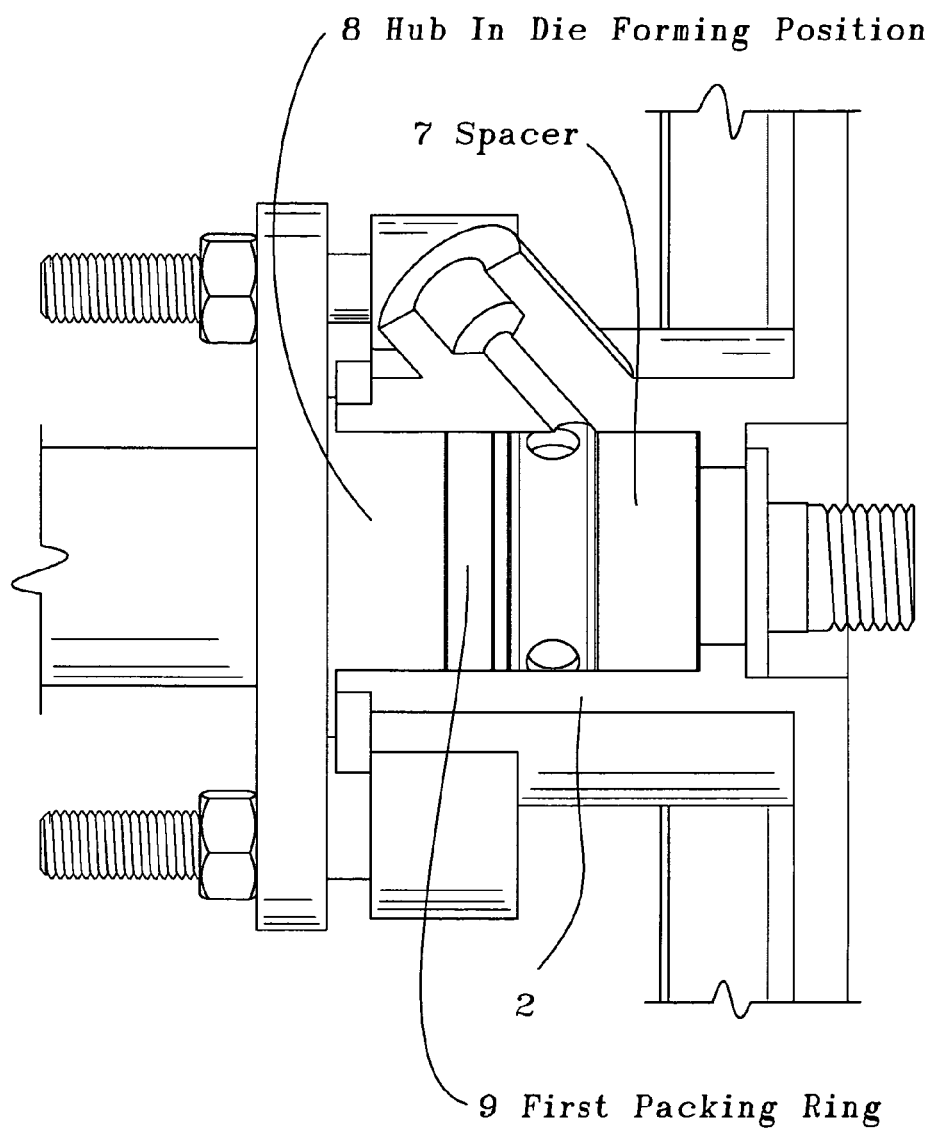
FIG. 2 is a side view of the mechanical packing system employing only a single piece of packing as occurring while die forming in place during installation.

FIG. 1 illustrates the mechanical sealing means to seal the moving parts of the device, such as a pump or valve or other types of devices. The mechanical sealing device is provided with a packing gland assembly 1 comprising a packing gland flange 4 cooperatively attached to a packing gland hub 5 in a running position. The packing gland assembly is used in conjunction with a stuffing box 2 having a plurality of packing rings 6. As shown in FIG. 2, the number of packing rings can be reduced from six or more, to three more or less packing rings, thereby reducing the time and expense required to pack or re-pack the stuffing box 2. As illustrated in FIG. 1, a standard spacer 3 could be employed. As shown in FIG. 2, the number of packing rings is reduced from six to three, thereby reducing the time and expense required to pack or re-pack the stuffing box glands, and utilizing a spacer 7 with an extended length.

Figure 5:
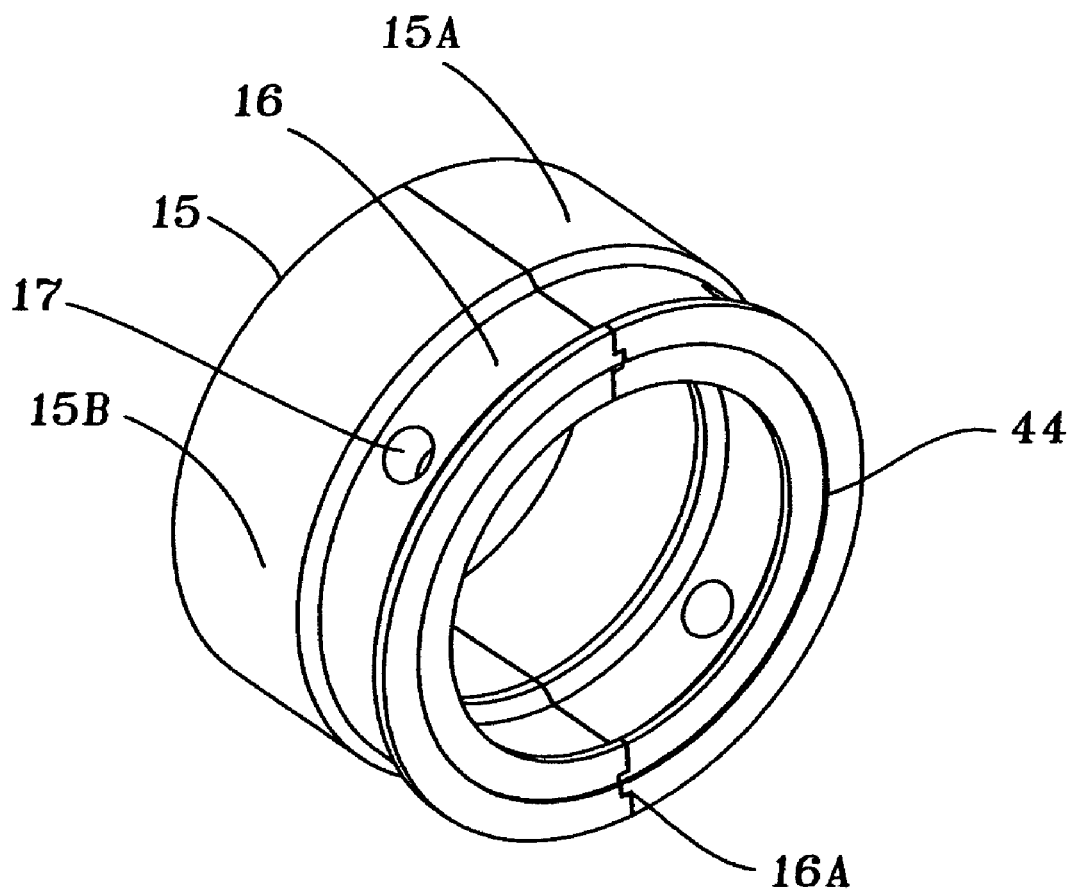
FIG. 5 is a perspective view of one embodiment a spacer.
Figure 6:
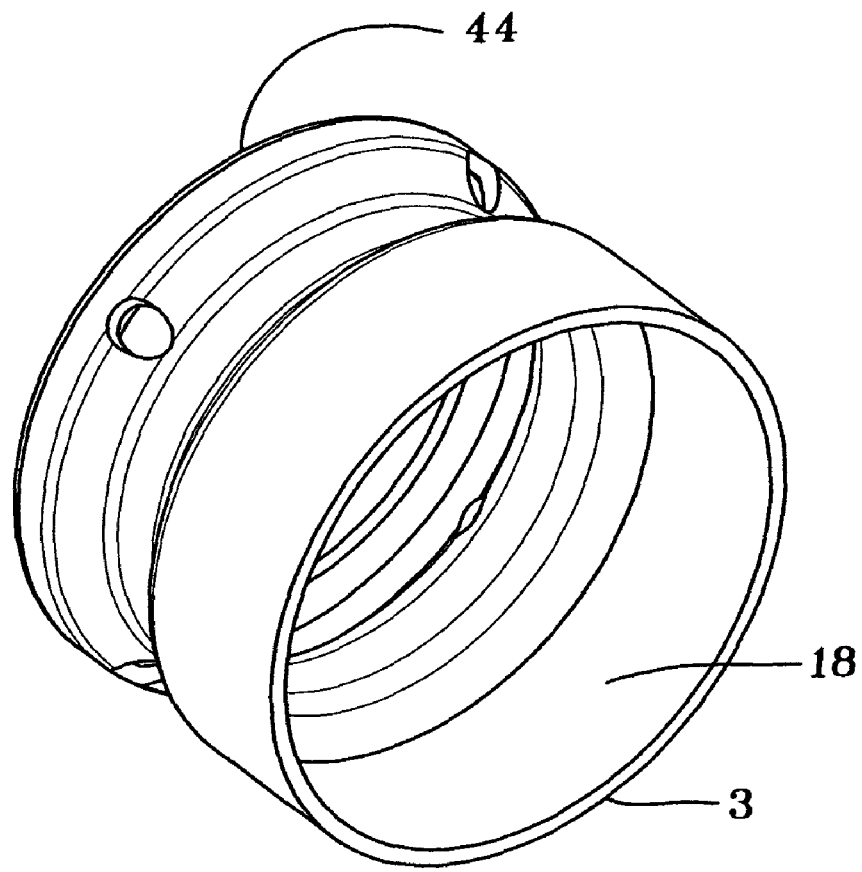
FIG. 6 is a perspective view of a second embodiment of the spacer.
Figure 9:
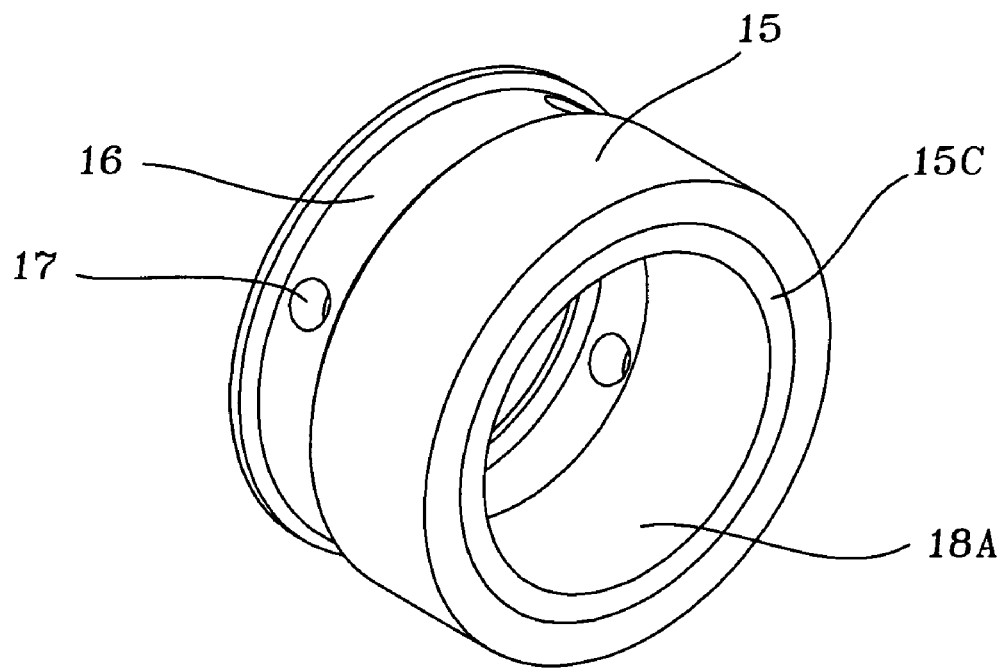
FIG. 9 is a perspective view of a third embodiment of the spacer.

FIG. 2 shows the use of the spacer 7 which fills the space of the stuffing box 2, thereby reducing the number of packing rings to three. This is accomplished by utilizing an extended length spacer as illustrated in FIGS. 5, 6 and 9. FIG. 2 also shows the mechanical packing system with hub 8 in the loading, die forming position in which the first ring of packing material 9 is installed and is in contact with the spacer. This packing system utilizes packing materials which allow for a three ring, more or less, installation resulting in a dripless or a nearly dripless installation. Each additional ring, when installed, would then contact an adjacent ring.

Figure 3A:
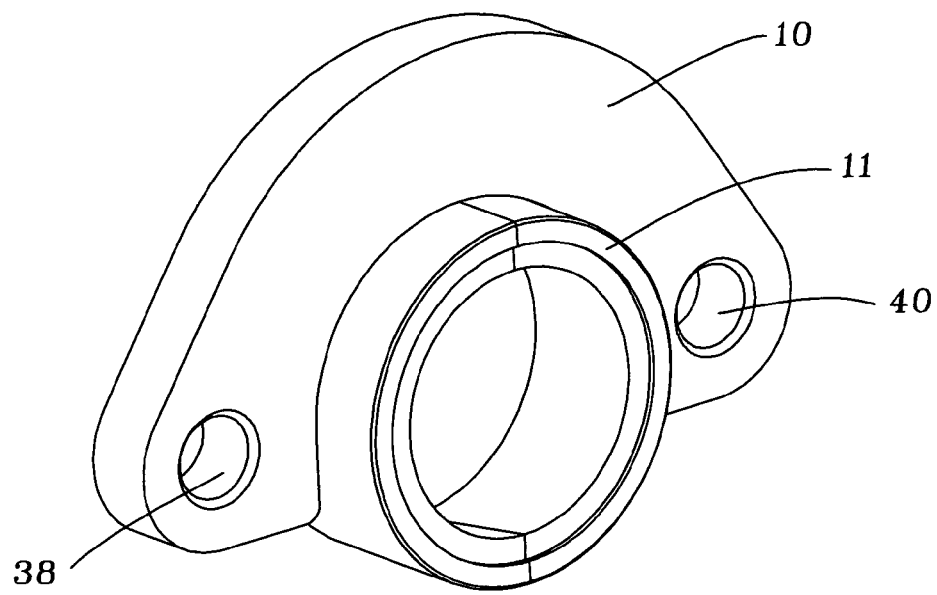
FIG. 3A is a perspective view of a packing gland with a flange in the running or operating position.
Figure 3B:
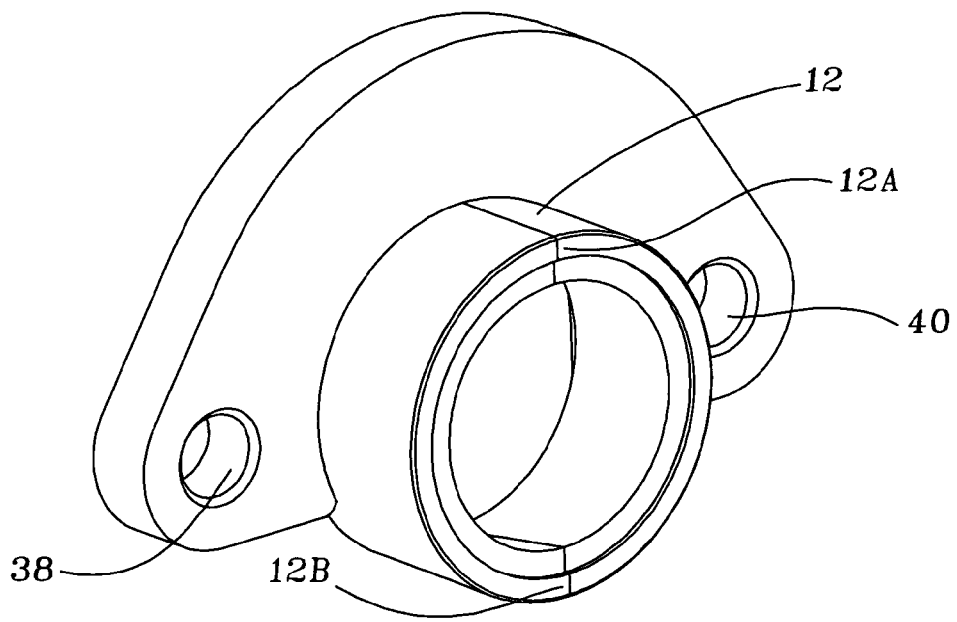
FIG. 3B is a perspective view of the packing gland with a flange in the die forming position.
Figure 4:
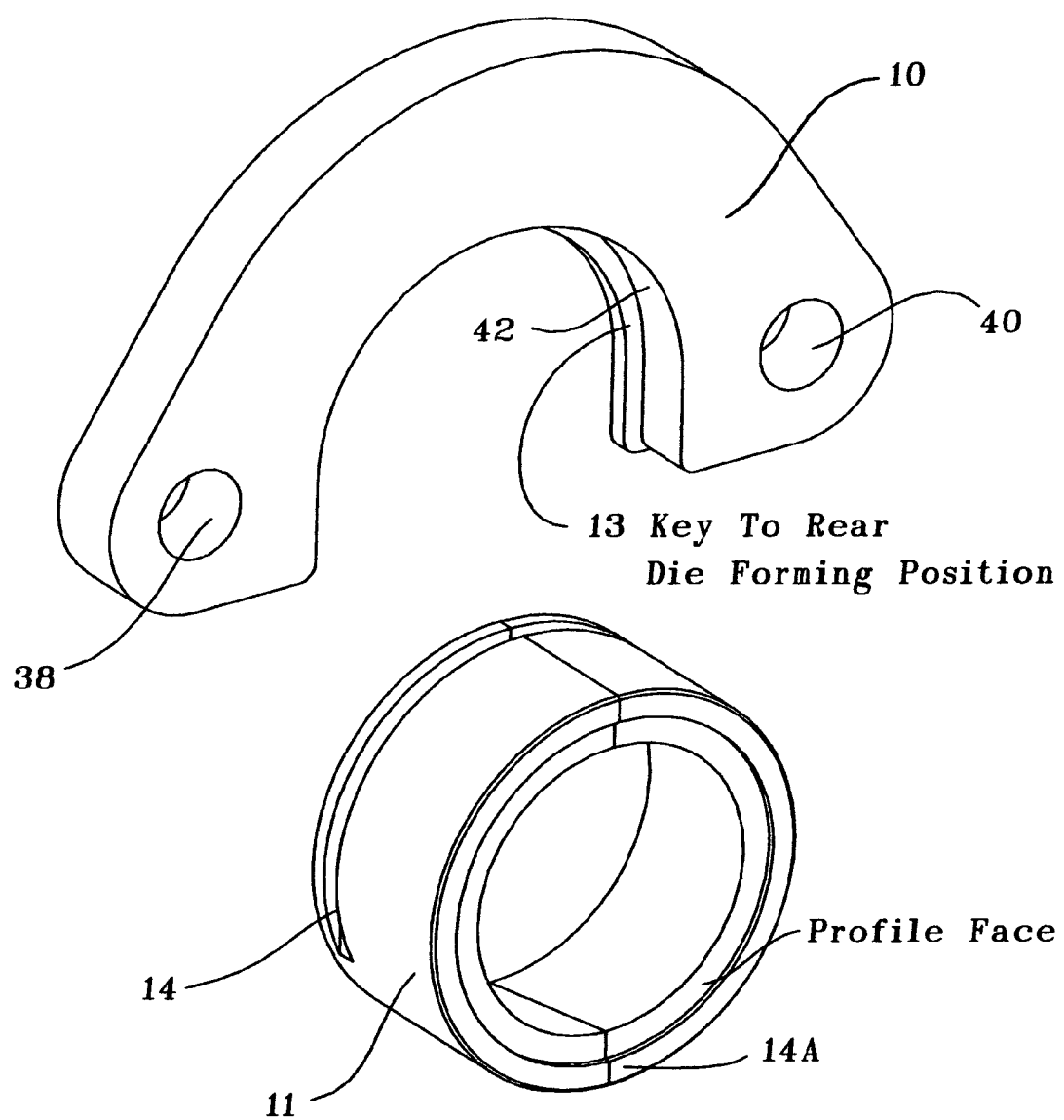
FIG. 4 is an exploded perspective view showing the packing gland removed from the packing gland hub.

FIGS. 3A, 3B and 4 show various views of the packing gland flange 10 and the hub 11. The flange 10 is designed to be inserted over the hub 11 in both the running position as illustrated in FIG. 3A and the loading or die forming position as shown in FIG. 3B. The flange 10 would extend around the periphery of a portion of the hub 11 which is provided with a profile face 14A as illustrated in FIG. 4. The hub 11 can be constructed from a single piece of material or from two complementary halves which are split at 12A and 12B of the profile face 14A.

As shown in FIG. 4, the hub 11 is provided with a key slot 14 extending around the hub 11 for approximately 180°. However, the exact length of this key slot 14 is not important. What is important is that the key slot 14 is offset from the center of the hub 11. The flange 10 is provided with an inner horseshoe shaped surface 42 having a key 13 running for its entire length and extending outwardly therefrom. Similar to the key slot 14, the key 13 is offset from the center of the horseshoe shaped surface 42. Therefore, as shown in FIG. 3A, when the key 13 is inserted into the key slot 14, the packing gland flange 10 and the hub 11 would be in the running position of the mechanical device with the flange 10 offset onto one side of the hub 11. However, when the packing flange 10 is reversed and the key 13 is inserted into the key slot 14 as shown in FIG. 3B, the packing gland with the flange would be in the loading position with the flange 10 offset onto the second side of the hub 11. Therefore, when each of the packing rings 6 is inserted into the stuffing box 2, the packing gland and flange would be shown in FIG. 3B. However, when the mechanical device is operating, the packing gland and flange would be in the position shown in FIG. 3A. The flange 10 is provided with holes 38 and 40 which are used to affix the packing gland assembly 1 to the mechanical enclosure through the utilization of bolts 32 and their respective nuts 30, 36.

FIGS. 5, 6 and 9 show various embodiments of the spacer 3. Similar to the hub shown in FIGS. 3A, 3B and 4, the spacer as shown in FIG. 5 can consist of two pieces having a joint 16A extending from a first profile face 44 through an extended length 15A to a second profile face 15. The spacer can be provided with a bore which may be tapered to aid in the release of solids that may be present in the fluids. The bore could be straight with the clearance selected to control the flow of fluids. The spacer includes an integral lantern ring 16 recessed into and extending around the outer or inner surface of the spacer. A number of holes 17 are used to flush fluid from the packing system and along with the thickness of the lantern ring 16 provide for controlled amounts of thermal conductivity from the packing contacting the profile face 44 and the extended length 15A. The thickness of the integral lantern ring could vary for the purpose of controlling thermal conductivity.

As illustrated in FIG. 6, the spacer 3 is produced in one piece from a thin wall tubing 18. Similarly, the embodiment shown in FIG. 5, an integral lantern ring is provided having a plurality of holes for flushing fluid from the packing system.

FIG. 9 shows the spacer 15 within an additional liner 15C which can be made of various materials chosen to prevent marring or galling when installed around the shaft or valve stem to be sealed. Holes 17 may be varied in size and number and the wall thickness of the material under integral lantern ring groove 16 may be varied to control the heat transfer from the packing to the liner 15C which may be made from material of various melting points. This is an improvement over previous designs which may be made of materials which deteriorate or melt under high heat conditions generated by the packing. Bore 18A is sized to control flow of the flush fluid introduced into the integral lantern ring 16 and transferred to the interior of the spacer by way of holes 17. Materials of construction of liner 15C may be but not limited to metal, plastic, composite, carbon etc.

The spacer of the present invention represents an improvement in existing spacers in that it uses the poor heat transmission qualities of stainless steel to protect the usually low melting point materials used in making spacers that do not mark or gall the shaft. By using a large number of holes and making the lantern ring wall thin the heat transfer can be greatly reduced from the spacer face in contact with the packing to the rests to the spacer holding the liner material.

Returning to FIGS. 3A, 3B and 4, the key slot 14 forms a flat which does not allow rotation of the hub 11 within the flange 10 when the key 13 is inserted into the key slot 14 in both the running position as shown in FIG. 3A, as well as the loading position as illustrated with respect to FIG. 3B. The flange 10 is removable and therefore is out of the way during the packing or repacking process.

Since the packing gland assembly 1 is utilized in the insulation of the packing rings 6, it is important that the hub be of sufficient length to reach the first packing ring during the loading or packing of the stuffing box 2. More than one key slot 14 may be required in a particular hub to reach the desired depth in a stuffing box.

The spacer shown in FIG. 5 can be constructed from two pieces 15A and 15B and would have circular mating faces 16A where the joints aid in the stability during the assembly process and reduce leakage from the interior to the exterior of the spacer. The spacer could be constructed as one piece as shown in FIG. 6. The spacer 15 can be constructed of a variety of materials including but not limited to metal, ceramic, plastic and composite materials.

Figure 8:
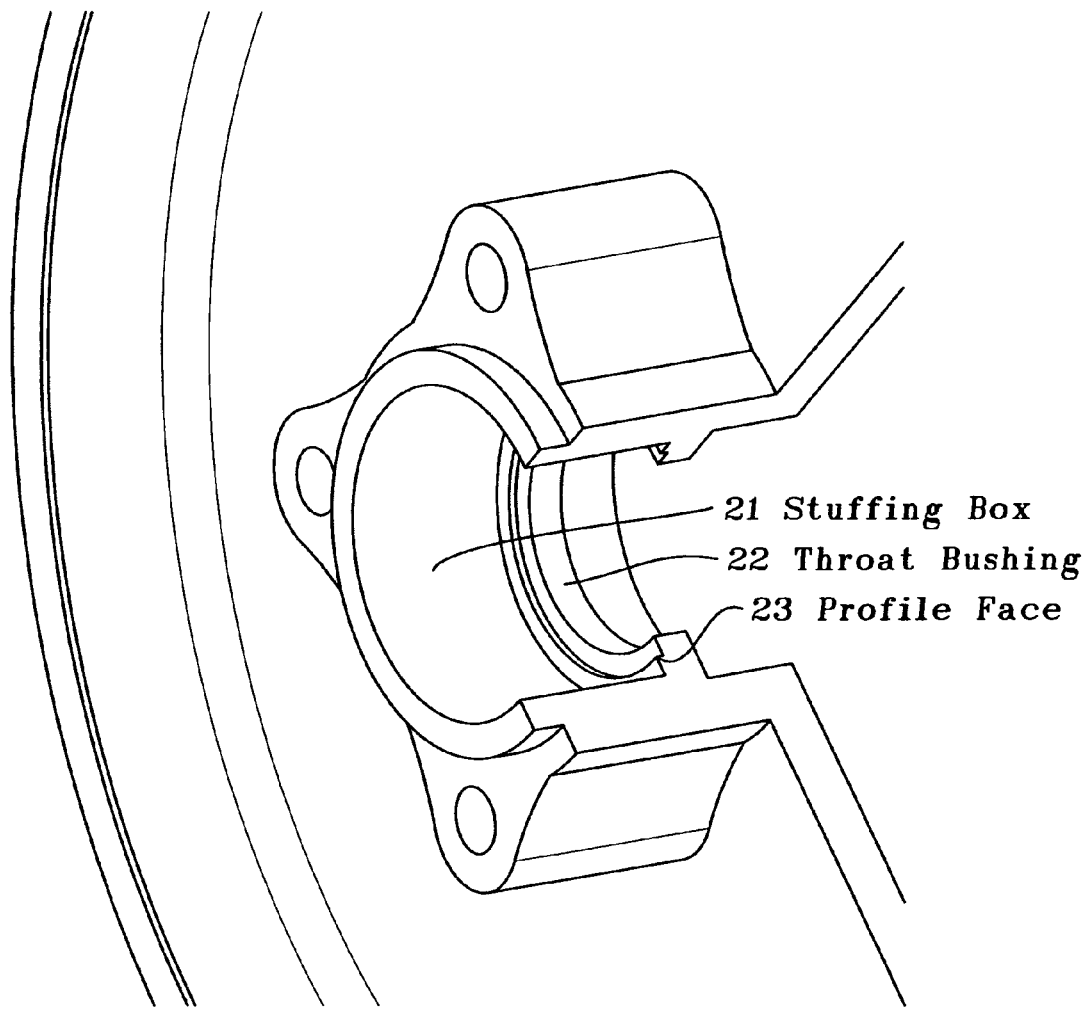
FIG. 8 is a perspective view of a typical stuffing box designed for the mechanical packing system.

As illustrated in FIG. 8, a stuffing box 21 stuffing box includes a throat bushing 22 and a profile face 23. Stuffing box 21 should be of sufficient depth so that it can be utilized if only three, more or less, rings of packing material are installed and eliminate the need for a lantern ring or spacer.

Figure 7:
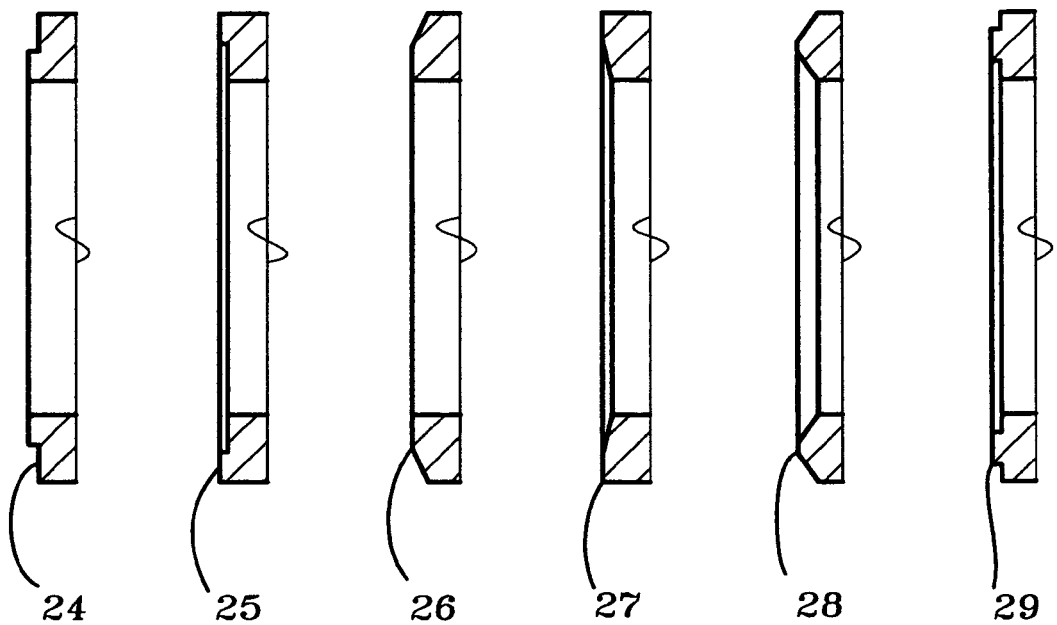
FIG. 7 shows face profiles of the packing gland hub, spacer and throat bushing.

The stuffing box would have a profile 23 selected from the profiles 25, 26, 27 and 28 illustrated in FIG. 7. This setup of profiles would increase the density of the packing at various radial positions, thereby reducing the chance of leak path developing along the inner circumference of the packing by use of the step change in face 24, the outer circumference of the packing by use of the step change in the face 25, the inner circumference of the packing by use of an angular change in the face 26 or the outer circumference of the packing by use of the angular change in the face 27. The chance of leak paths developing would also be reduced through the use of a middle or lap joint area of the packing by an angular step projection in the center of the face as shown by 28, 29.

During the operation of the mechanical packing system, the volume of the each individual packing ring and therefore the entire volume of multiple packing rings as a unit would decrease. Therefore, one or more packing rings must be added to the device. When this occurs, the flange is removed and one or more packing rings can then be inserted next to the last packing ring. In this case, the flange is inserted over the hub 11 into the running position, wherein the device can again operate. In the case in which no additional packing rings are available, it is possible to then reverse the position of the packing ring such that it is in the insulation position at which time the device would be able to operate.

The installation of the packing will now be explained. The flange 4 and hub 5 are removed during the insertion of the packing ring 6 into the area formed by the stuffing box and pump shaft, or valve stem. In order to seat a packing ring in the bottom of the stuffing box, the hub 5 (a single piece configuration) or if a two piece configuration, the hub 5 and the flange 4, is re-installed in the loading position. Then by hand, the packing gland assembly 1 is used to move each packing ring as far as possible to the interior of the stuffing box 2 as shown in FIG. 2. As the flange 4 of the packing gland assembly 1 moves the packing ring into place, the bolts 32 of the stuffing box 2 would engage the respective holes 38, 40 of the flange 4. When the packing has been seated in the stuffing box as far as possible by hand, the nuts 32 are installed over their respective bolts 32 by use of the appropriate wrench. The packing gland assembly 1 is then forced into the stuffing box 2 with sufficient pressure to remove all voids that might exist in the packing. This forming of the packing material in a closed cavity under pressure is referred to as die forming. The nuts 32 of the packing gland assembly 1, and two piece hub if used, are then removed and the process is repeated again with additional packing rings. At the appropriate time, usually prior to the loading of the third packing ring, the flange 4 is reversed from the loading position shown in FIG. 3B to the running position shown in FIG. 1 and FIG. 3A. At this point, the nuts 32 are tightened to the appropriate amount and the device is placed into service.

The invention may be embodied in other specific forms without departing from the spirit or central characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to embraced therein.

What is claimed is:

1. A system for sealing moving parts of a mechanical device using a plurality of packing rings, comprising:
    a stuffing box;
    a spacer provided in said stuffing box;
    a hub provided in said stuffing box, said hub aligned with said spacer, said hub having an exterior surface extending from a first end of said hub to a second end of said hub, said hub further provided with a slot having two shoulders provided on both sides of a groove extending along said exterior surface of said hub, said slot offset from said first and second ends of said hub resulting in the distance from said first end of said hub to said slot being greater than the distance from said second end of said hub to said slot, said first end of said hub facing said spacer when said hub is installed in said stuffing box;
    a flange detachably mounted on said hub, said flange provided with an exterior surface extending from a first end of said flange to a second end of said flange, said flange provided with a key extending along said exterior surface of said flange, said key provided between and offset from said first and second ends of said flange resulting in the distance from said first end of said flange to said key being greater than the distance from said second end of said flange to said key; and
    at least one bolt and nut for removably securing said flange to said stuffing box,
    wherein a first packing ring is placed in said stuffing box adjacent to said spacer, a portion of said hub is provided in said stuffing box with said first end of said hub facing said spacer at a first distance from said spacer and said key of said flange is inserted into said slot of said hub in a first loading position with said first end of said flange facing away from said spacer to die form said first packing ring, and further wherein additional packing rings are placed in said stuffing box contacting adjacent packing rings to die form said additional packing rings, said first end of said hub is provided in said stuffing box at a distance from said spacer greater than said first distance, and further all of the packing rings have been die formed, the position of said flange is reversed, such that said key of said flange is inserted into said slot of said hub in a second running position with said first end of said flange facing said spacer to operate the mechanical device with the packing rings in place.

2. The system in accordance with claim 1, wherein said hub is constructed from complementary halves.

3. The system in accordance with claim 1, wherein said spacer is constructed from complementary halves.

4. The system in accordance with claim 1, wherein said spacer includes an integral lantern ring.

5. The system in accordance with claim 4, wherein said integral lantern ring is provided with a plurality of drain holes for controlling thermal conductivity.

6. The system in accordance with claim 4, wherein said integral lantern ring is provided with various thicknesses for controlling thermal conductivity.

7. The system in accordance with claim 4, wherein said integral lantern ring is provided with an internal surface to reduce or prevent marring or galling.

8. A method for sealing moving parts of a mechanical device using a plurality of packing rings provided in a stuffing box including a spacer, comprising the steps of:
    (a) inserting a first packing ring in the stuffing box adjacent to the spacer;
    (b) attaching a flange to a hub in a loading position, said hub provided with a front end by inserting a key provided on the exterior surface of said flange and offset from the center of the exterior surface of said flange into a slot provided on the exterior surface of said hub and offset from the center of the exterior surface of said hub to produce a packing gland assembly;
    (c) inserting said packing gland assembly into the device with said front end of said hub forced against said first packing ring, said front end of said hub provided at a first distance from the spacer within said stuffing box;
    (d) attaching said packing gland to the stuffing box;
    (e) die forming said first packing ring in the stuffing box;
    (f) removing said packing gland from the device;
    (g) inserting a second packing ring into the stuffing box adjacent to the first packing ring;
    (h) re-inserting said packing gland assembly into the device with said front end of said hub of said packing gland assembly forced against said second packing ring, said front end of said hub provided at a second distance from said spacer in the stuffing box, said second distance greater than said first distance;
    (i) re-attaching said packing gland to the stuffing device die forming said second ring in the stuffing box;
    (j) repeating steps (f), (g), (h) and (i) to die form additional packing rings in the stuffing box;
    (k) removing said flange from said hub;
    (l) attaching said flange to said hub in a running position by reversing the position of said flange when said key of said flange is inserted into said slot of said hub to again produce the packing gland assembly; and
    (m) re-attaching said packing gland to the stuffing box to allow the mechanical device to operate in said running position.

* * * * *